United States Patent [19]
Woodward

[11] 3,812,331
[45] May 21, 1974

[54] TRANSMISSION MOUNTED SPEED SENSOR WITH ODOMETER SWITCH

[75] Inventor: Gary F. Woodward, Ann Arbor, Mich.

[73] Assignee: Ford Motor Company, Dearborn, Mich.

[22] Filed: Dec. 5, 1972

[21] Appl. No.: 312,407

[52] U.S. Cl.................. 235/95 R, 235/96, 324/167
[51] Int. Cl............................................ G01c 22/00
[58] Field of Search............ 235/95 R, 103, 151.32; 324/167, 168, 171; 73/490

[56] References Cited
UNITED STATES PATENTS

| | | | |
|---|---|---|---|
| 3,166,245 | 1/1965 | Maschke | 235/95 R |
| 3,307,782 | 3/1967 | Henss et al. | 235/95 R |
| 3,659,780 | 5/1972 | Woodward | 235/95 R |

*Primary Examiner*—Stephen J. Tomsky
*Attorney, Agent, or Firm*—Joseph W. Malleck; Keith L. Zerschling

[57] ABSTRACT

An electrically operated odometer system having a transmission-mounted sensor unit characterized by compactness and smoothness of operation. A wobble type planocentric gear reduction in combination with unique rotary switch means is employed to achieve such characteristics.

6 Claims, 11 Drawing Figures

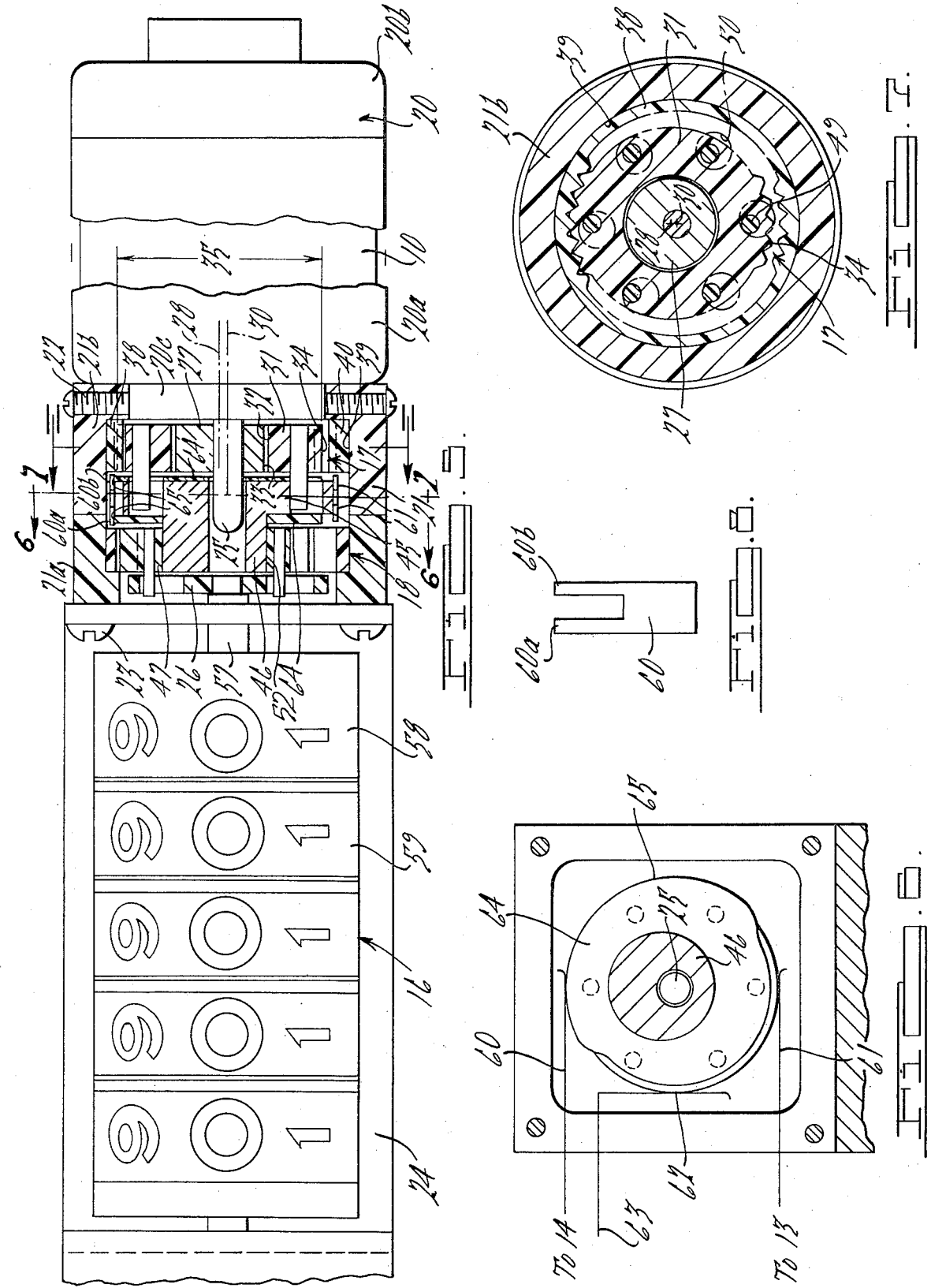

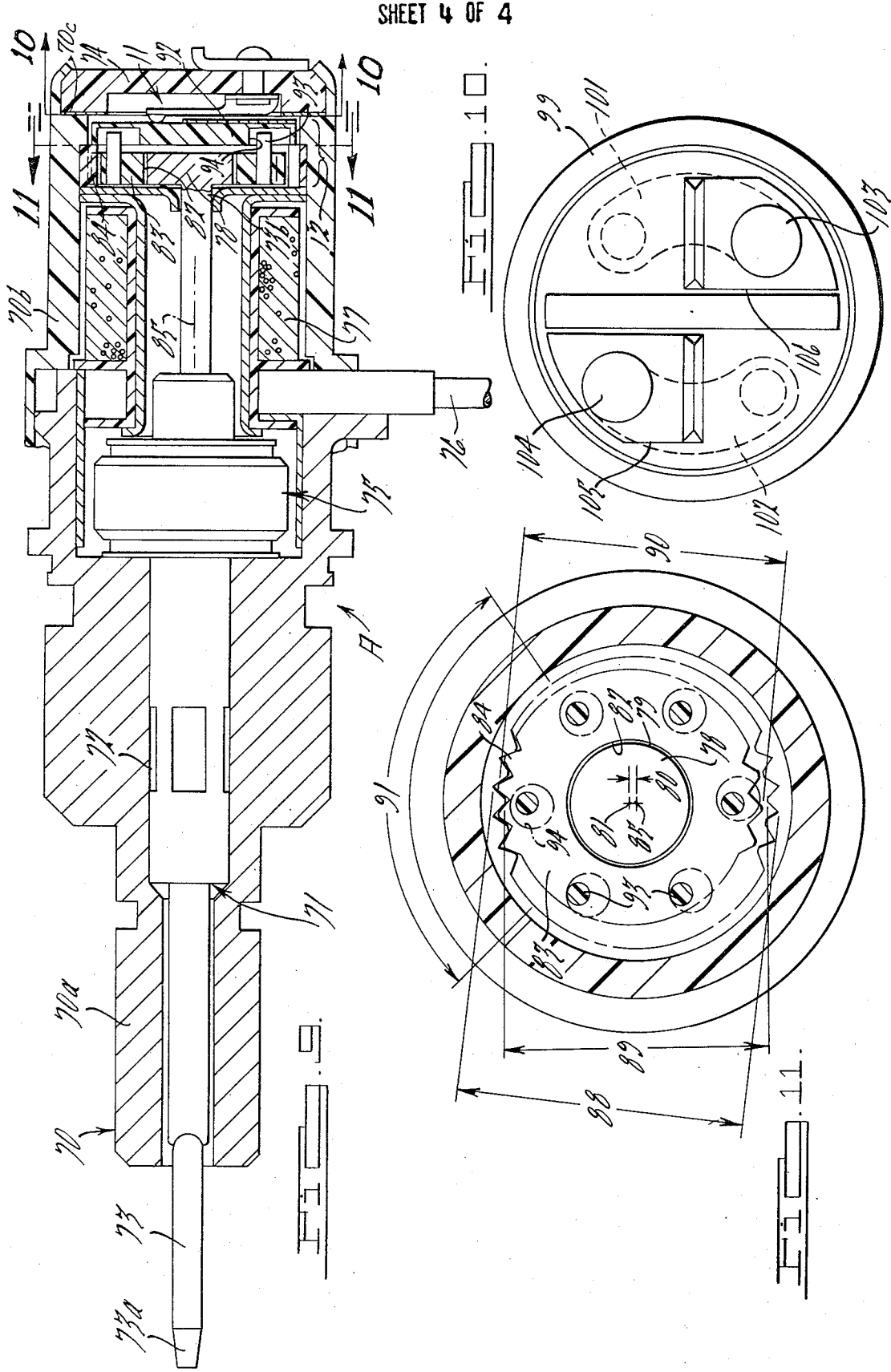

TRANSMISSION MOUNTED SPEED SENSOR WITH ODOMETER SWITCH

BACKGROUND OF THE INVENTION

It is typical for commercial odometer systems of the electrically operated type to provide an odometer drive motor with pulses or timed flow of electrical energy from a suitable source controlled by a switching mechanism in part disposed in a remote sensor unit, the latter being responsive to vehicle speed. Some form of torque conversion is necessary within the sensor unit to utilize the high rotary speed of some vehicle component to which the sensor unit is responsive. A transmission gear reliably corresponds to the movement of the vehicle and typically is used as the vehicle component. Many types of gear reductions or solenoid ratchet motors have been used to achieve a high ratio step down in rotation.

Automotive design is placing greater premiums on space for all apparatus, such as an odometer system. To reduce the size of the sensor unit, it is desirable that the entire step down be accomplished in a single plane, if possible, and with a ratio of at least 25 to 1. The prior art has been unable to do this in the environment of an odometer system and has turned instead to multiple number of elements such as worm, spur, or helical gears.

SUMMARY OF THE INVENTION

The primary object of this invention is to provide an electrically operated odometer system having a remote sensor unit adapted to be inserted in a transmission assembly and which is characterized by compactness and smoothness of operation.

Another object of this invention is to provide an electrically operated odometer system having a sensor unit utilizing a gear reduction unit confined substantially to a planar configuration and having a switching mechanism to convert the output of such gear reduction into a suitable electrical control, the switching mechanism similarly being characterized by a generally planar configuration.

BRIEF SUMMARY OF THE DRAWINGS

FIG. 5 is a central sectional view of the indicator unit adapted for mounting on the dashboard of an automobile;

FIGS. 6 and 7 are sectional views respectively taken substantially along lines 6—6 and 7—7 of FIG. 5;

FIG. 8 is an elevational view of an electrical contact element forming part of the assembly of FIG. 6;

FIG. 9 is a central sectional elevational view of a remote odometer sensor unit; and FIGS. 10 and 11 are sectional views taken substantially along respective lines 10—10 and 11—11 of FIG. 9.

DETAILED DESCRIPTION

Figure 1:
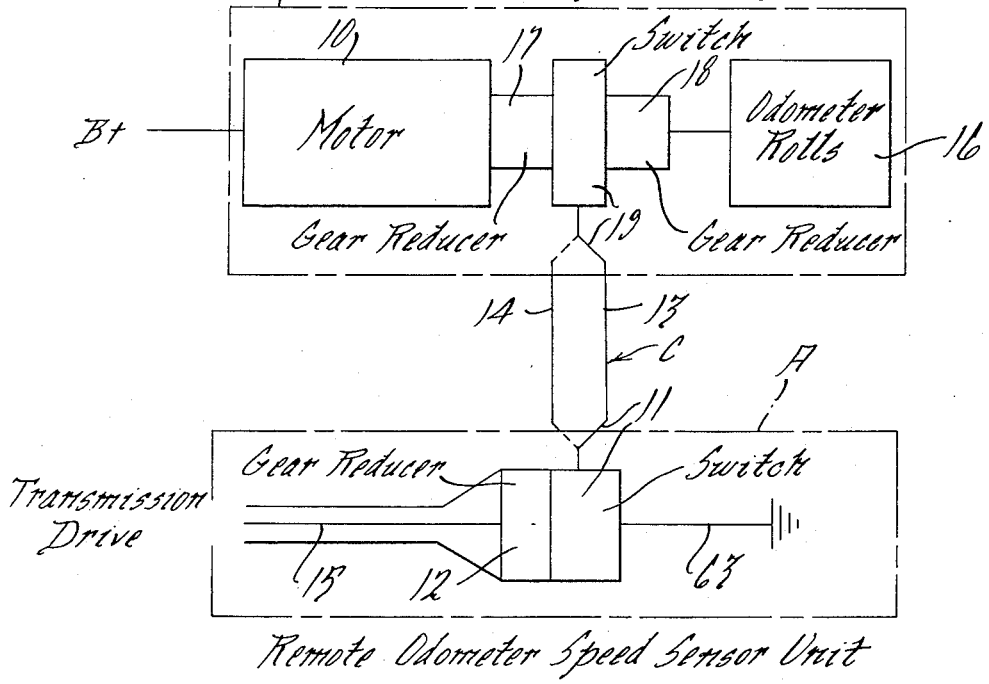
FIG. 1 is a schematic representation of the total odometer system embodying this invention.

The odometer system illustrated in the drawings, and preferably embodying the present invention, broadly comprises a remote sensor unit A and an indicating unit B for reading out the specific mileage incurred by an automobile. Both units are interconnected by a circuit means C employing a dual path therebetween, the circuit controlling the operation of a motor 10 forming part of the indicating unit. The sensor unit A picks up rotary motion thru a member 15 connected to a component such as a gear within the transmission of the vehicle which turns proportionally to vehicle movement; the sensor unit actuates a switch 11 through a step-down reduction means 12 to thereby regulate alternatively the closing of one of the parallel paths 13 and 14 of said circuit.

The indicating unit B is conveniently mounted in the panel of the automobile for read-out and has motor 10 arranged to receive electrical energization as permitted by the control circuit to drive a plurality of odometer rolls 16 through a double set of step-down gear reduction means 17 and 18 and incorporating a switch 19 arranged about an intermediate member of the double gear reduction means. Switch 19 is responsive to a predetermined operation of the motor 10 (equivalent to indexing one numeral or degree corresponding to a fractional mile on the first of said rolls) to de-energize the instantaneous circuit path and put the switch into another condition whereby an alternative parallel path is closed in readiness to receive the next energization cycle of the remote sensor unit.

The object of the use of dual electrical paths in conjunction with double-acting switches, is to obtain alternating energy flow to the motor as the sensor switch alternates between positions corresponding to a predetermined distance experienced by the vehicle, preferably 1/80 of a mile for the embodiment of this invention. This is derived from the fact that for the preferred embodiment the member 15 undergoes 1000 revolutions for each mile, the output member of means 12 undergoes a 25/1 gear reduction to turn 40 times; finally the switch is actuated twice for each revolution of the output member. Thus the sensor switch is cycled for each 1/80 of a mile experienced by the vehicle.

Turning now to the indicator unit, as the motor operates in response to flow of energy through one of the electrical paths 13 or 14, the switch 14 will be moved by motor 10 to an alternate position (to the other electrical path) after a predetermined number of revolutions of the motor has been experienced. The latter number of revolutions depends on the size and character of the motor, but must move the first odometer roll an arcuate distance to indicate one-eightieth of a mile which is less than one full numeral change. Once this has been accomplished, the motor is de-energized due to the switch connecting with the other path, presumably not closed by the sensor switch 11. When the vehicle experiences another one-eightieth of a mile movement, the sensor switch will again change position to close on the path already closed by switch 19. As a consequence, energy will again flow to activate the motor and position the odometer rolls for an additional mileage indication equivalent to one-eightieth of a mile.

A prime consideration in the development of this invention was the achievement of high-ratio reduction of rotary movement within space limitations somewhat equivalent to the thickness of a single flat gear. High efficiency, durability and ability to produce relatively high torque at the output member are additional desirable characteristics sought. To accomplish these ends, and turning firstly to the indicating unit B shown in some particularity in FIGS. 5, 3, 6 and 7, a permanent magnet electric motor 10 is connected to a plurality of odometer rolls 16 of conventional construction, through reduction gearing 17 and 18. The permanent magnet motor 10 and reduction gearing are enclosed in a plastic housing 20 and a metallic housing 21 respectively. The housing 20 includes a generally cup-shaped portion 20a closed by an end wall 20b. The motor may be positioned in spaced relationship to the cup-shaped portion. Metallic housing 21 is formed of split portions 21a and 21b, portion 21b being fitted about an extension 20c of housing 20 and held in place by set screws 22. Portion 21a is fastened at 23 to a suitable plastic housing 24 for the odometer rolls; the fasteners extending through to portion 21b.

Drive between the input member 25 and the output member 26 of the transmission comprised of gear reducers 17 and 18, follows substantially the following train of elements: input shaft 25, cam 27, pinion 31, transfer element (cam 46), pinion 47, and output 26. The gear reductions employ a novel wobble-type planocentric arrangement herein defined to mean at least two loosely related concentric gears in a common plane such that for each planetary cycle of one gear relative to the other, the one gear will undergo only a highly small arcuate movement about its own axis. The camming element 27 is journalled on the input member or shaft 25 of the motor for rotation therewith; the cam 27 is generally circular having a geometric axis or center 28 offset a distance 29 from the axis 30 of the rotatable input member 25 (see FIGS. 4 and 5). A pinion 31 is mounted on the camming member having a circular internal opening 32 generally commensurate but slightly larger than the annular camming surface 33 and carrying a plurality of radially outwardly projecting serrations or gear teeth 34, the outer extremities of the serrations having a maximum diameter 35 and the valleys of the serrations determining a minimum diameter 36. The geometric center 28 of the internal opening for the pinion also constitutes a geometric center for the maximum and minimum diameters 35 and 36. A fixed ring gear 38 is mounted within the internal wall 39 of the housing portion 21b. The ring gear 38 has a plurality of radially inwardly projecting serrations 40 complementary in configuration to the serrations 34 of the pinion 31; the minor diameter 41, but not the maximum diameter 42, of the ring gear serrations is greater than the maximum diameter 35 of the pinion serrations. In addition, the geometric center of pinion serrations is offset from the geometric center of the ring gear so that at least one zone 42 or portion of pinion serrations will be in contact with the serrations of the fixed ring gear at any one time (see FIG. 4).

In order to provide a high-ratio step down, the ring gear serrations are here, one greater in number than the pinion gear serrations, 40 teeth to 39 teeth to provide at least a 40 to 1 gear reduction ratio. All of said elements including the pinion, ring gear and cam are substantially coplanar in the sense that their thickness is relatively small compared to a radial dimension and all are substantially in line in a radial direction.

Figure 4:
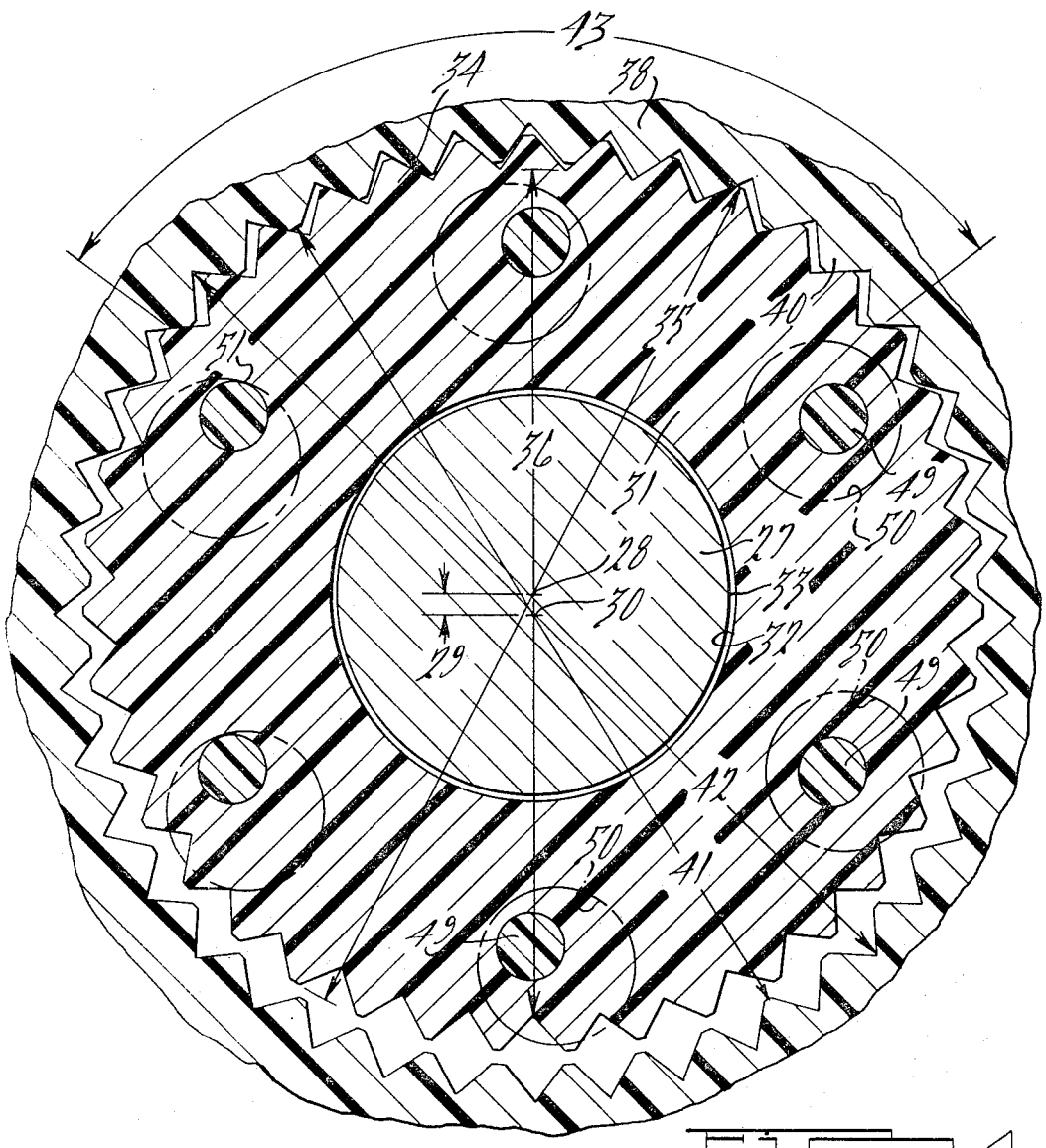
FIG. 4 is an enlarged elevation view of the planocentric means for the sensor unit.

The second gear reducer 18 shall now be described; the use of tandem planocentric means is preferred to achieve a tailored degree of reduction suited for a particular sized motor. The output from the first gear reduction 17 is provided by way of a plurality of pins, or in some cases integral projections 49 extending to one side and parallel to the axis of rotation, said projections 49 are equally circumferentially arranged, fixed at one end 49a to the pinion and have another end 49b extending into an opening 50 provided in a transfer element 45 adapted to receive drive from the gear reduction 17. A plurality of equi-circumferentially arranged openings 50 are provided such having each diameter sufficient to accommodate movement of the projection therein of at least twice the eccentric dimension 29. As the projections 49 are moved by the pinion, they undergo a toroidal path which requires freedom to move within the openings. However, as shown in FIG. 4, at least one projection will maintain contact (as at 51) with the wall of an opening at all times; the contact 51 shifts progressively from projection to projection during operation. The transfer element 45 has an integral portion offset to one side in a plane adjacent thereto to define cam 46 and carry a camming surface 52 similar to the camming surface 33 of the first gear reduction.

Comparable members such as a pinion 47 with the same number of radially outwardly projecting serrations 53 and dimensioning; and a similar fixed ring gear 54 (press-fitted to the internal wall of housing portion 21a) having serrations 55 disposed about the pinion 47. Projections 56 extend from the pinion, the same in number and mounted the same to function to transmit continuous drive to the final output member 26 in the form of an annular disc press-fitted onto the shaft 57 which also supports and mounts the first odometer roll 58 and is lined with similar shafting (not shown) for the remainder of the odometer rolls 59. The member 26 has equi-circumferentially arranged openings with circular walls to receive progressive contact from the projections as previously described in FIG. 4.

Because of the compactness of the tandem gear reduction set, a switching mechanism 19 is employed which is disposed substantially within the plane or commensurate to the thickness of the transfer element 45. Member 50 is formed of conductive material so as function in carrying current and is connected to the motor through a bladed contact 62 connected to motor lead 63. Switch blades or contacts 60, 61 which are in electrical contact respectively with the legs 13 and 14 of the dual circuit and extend inwardly to make tangential contact with the outer edges of the conductive transfer element 46 except as prevented by nonconductive camming means 64 (in the form of discs having camming edges 65) which will limit the radially inward resilient movement of the conductive blades 60 and 61. Each of the switch blades are bifurcated partially to define portions such as 60a and 60b as shown in FIG. 8. The portions thereof are adapted to overlay opposite side edges of the transfer element and are resiliently biased inwardly to make contact with either the outer periphery of the element or the camming edge. Each of the camming plates have an arcuate portion forming camming edges which extend through an arc slightly less than 180° so as to maintain each of the switch blades 60 and 61 out of contact with element 46 during a lesser proportion of each revolution. This operation is comparable to the switch 11 disposed in that of remote sensor unit. Blades 61 are shown in contact in the lower portion of FIG. 5 and close an electrical path through circuit leg 13; blade 60 is out of contact as cammed by edge 65 and holds open or interrupts the electrical path through circuit leg 14.

Turning now to the sensor unit A, it comprises a housing 70 having a portion 70a enclosing a drive pickup assembly 71 and a portion 70b enclosing substantially the gear reduction 12 and switch 11. Assembly 71 has a bearing 72 centrally journalling a pick-up shaft 73. Portion 70a of the housing is nested within portion 70b and the latter has an open end 70c closed by a member 74 through which extends electrical contact elements to be described.

The shaft 73 has an outwardly extending end 73a having a suitable cross section for driving connection to a rotary member forming part of the transmission of an automotive vehicle. Typically, the housing 70 may be mounted through the opening in the transmission casing and suitably sealed. The other end 73b of the shaft extends into housing portion 70b for connection to a cam 78 forming part of the gear reduction 12. A midsection of the shaft may mount suitable apparatus 75 for providing speed related signals through the use of a magnet and generator assembly. Electrical cable 76 in connection with a winding 77 provides the output for such auxiliary equipment.

The sensor gear reduction 12 comprises the cam 78 in the form of a disc having a circular annular camming surface 79 functioning as such due to an eccentric offset 80 of rotary shaft 73 relative to the geometric center 81 of surface. The camming means 78 is nestably received within a central opening 82 of a pinion 83 carrying a serrated or toothed outer periphery 84. The pinion 83 is eccentrically mounted with respect to the axis 85 of rotation of camming means 78 by defining the opening 82 within the pinion as a circle thereby controlled by the offset surface 79. Disposed about the serrated or toothed periphery 84 of the pinion is a rigidly fixed ring gear 86 having radially inward serrations 87. For purposes of defining a step-down high-ratio conversion, the fixed ring gear contains, here preferably 25 teeth and the pinion has 24. The object is to obtain a single revolution of the pinion 83 for each 25 revolutions of the cam 78. To accomplish this, the maximum diameter 90 of the serrations of the pinion is dimensioned to be less than the maximum diameter 88 of the serrations of the ring gear, but at the same time greater than the minimum diameter 89 of the ring gear serrations. Accordingly, as the camming means undergoes a single rotation, the pinion will shift the zone 91 of engaged or meshed teeth gradually about the ring gear to obtain a relative advancement of the pinion to the ring gear equal to one tooth. Due to the difference in number of teeth between the ring gear and pinion, the pinion gear will advance or make up one tooth position for such revolution; to advance 25 teeth or one complete revolution, the zone 91 will have to undergo 25 revolutions. During such progressive shifting of the engaged teeth, the axis of the pinion undergoes a path travel which is noncircular and can be characterized as a wobble. Due to such "wobble" movement, a direct positive connection to the output 92 in form of a disc is not desirable. Accordingly, at least one pin integral projection 93 (and here preferably six circumferentially spaced thereabout) are attached to the pinion and extend through a plurality of respective equi-circumferentially spaced openings 94 in the disc 92, the openings having a diameter 95 greater than the diameter of each pin 96. Thus as the pinion undergoes its noncircular wobble movement, at least one projection will maintain contact with the wall of one of the openings 94 and such contact will shift progressively from projection to projection as each undergoes a toroidal movement.

Figure 2:
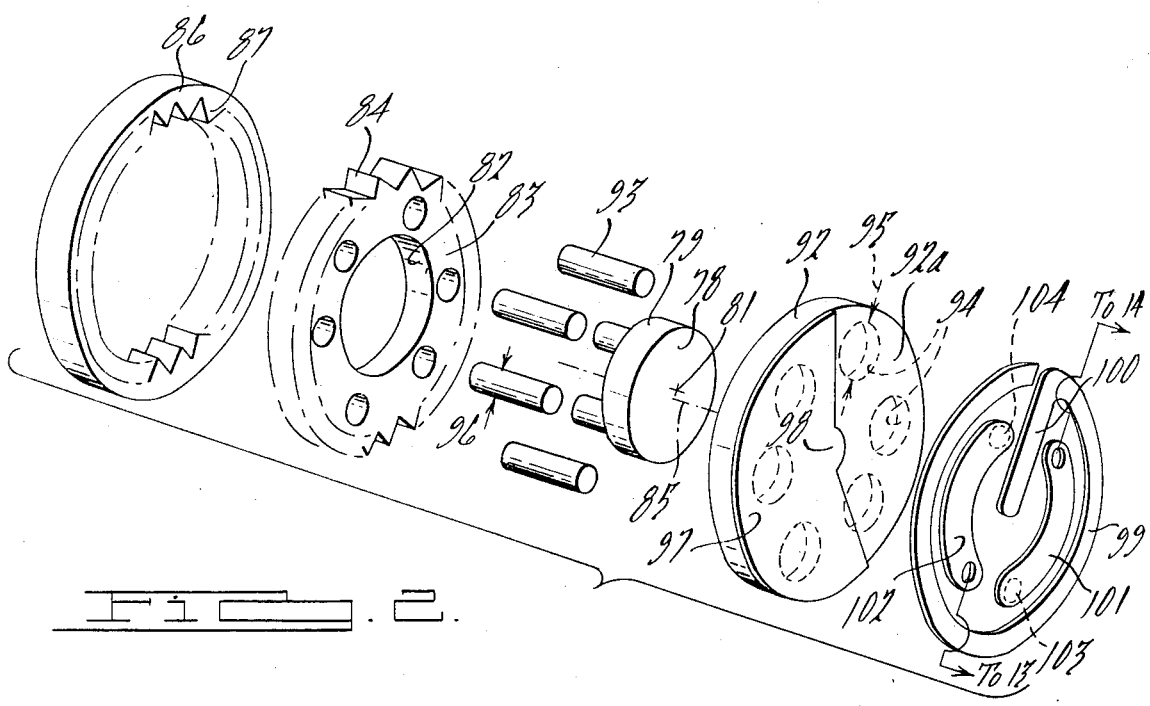
FIG. 2 is an exploded view, in perspective, of the indicator unit of FIG. 1.
Figure 3:
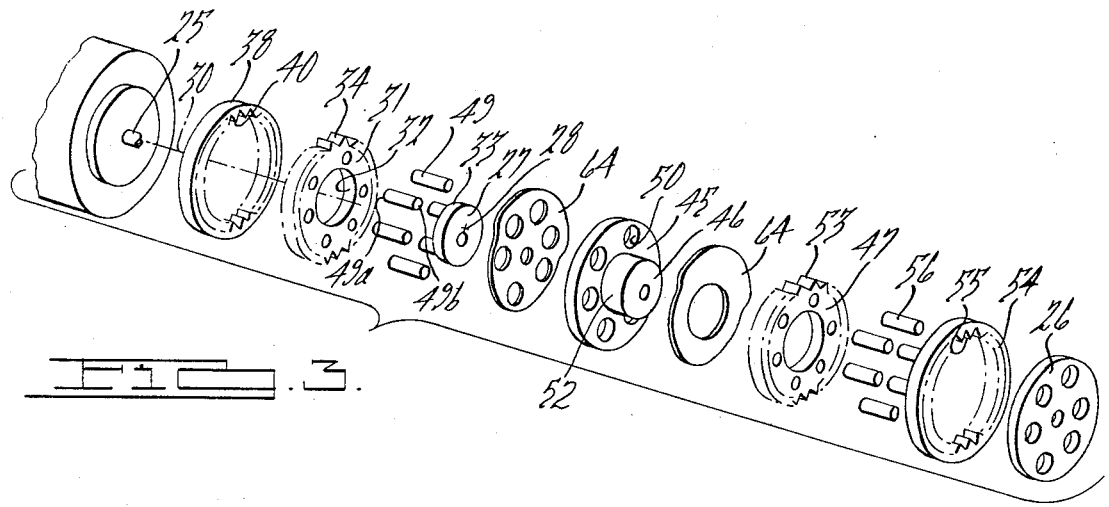
FIG. 3 is an exploded view, in perspective, of some components of the sensor unit of FIG. 1.

To obtain compactness in keeping with the ultracompactness of gear reduction 12, double-acting switch 11 comprises a conductive plate 97 defined in the shape of a sector of a circle (see FIG. 2) and is attached to side 92a of output member 92. The apex 98 of the plate sector is connected to ground via stamped circular conductive contact 99 having a finger 100 resiliently biased to engage the apex at all times. Resiliently biased conductive fingers 101 and 102 each have contact buttons 103 and 104, respectively; and are arranged to engage diametrically opposite locations on output member 92, the sector of plate 97 must be less than 180° so that only electrical path can ever be closed at any one time. For example, as output member 92 turns, sector plate 97 will sweep switch 12 so that contact button 104 is engaged with plate 97; this completes an electrical path through leg 13 of the dual circuit (connected via conductive bracket 105 to electrical wiring) allowing energy to flow to motor 10 if switch 19 is properly conditioned. After an additional 1/2 revolution of output member 92, contact button 104 will engage only the non-conductive disc 92 and not the plate sector 97. However, contact button 103 now can engage plate 97 completing a path through leg 14 (connected via bracket 106 to electrical wiring). Thus, the rotary position of member 92 is translated into an electrical communication relay whereby a motor may be sequentially energized to operate odometer rolls.

I claim as my invention:

1. In a vehicular odometer system having an electrical motor and odometer rolls driven by said motor, a remotely located odometer sensor for controlling electrical energization of said motor, comprising:
   a. an input member effective to provide rotary drive responsive to the distance traversed by said vehicle,
   b. an output member,
   c. planocentric means interconnecting said input and output members to provide a step-down in rotary movement therebetween of at least 25/1, and
   d. means responsive to a portion of each revolution of the output member to provide cyclical energization of said motor and thereby said motordriven rolls.

2. The sensor of claim 1 in which said planocentric means comprises:
   a. means drivingly connected to said input member providing at least one annular cam,
   b. a pinion eccentrically mounted in the plane of said cam for rotary movement as urged by said cam, said pinion having annularly arranged serrations and having means drivingly connected to said output member,
   c. a fixed ring in the plane of said cam having annularly arranged serrations for engagement in a zone with only a portion of the serrations on said pinion at any one time, said serrations of said ring being greater in number than the serrations of said pinion whereby predetermined multiple of rotations of said cam will result in one rotation of said zone of engagement between said pinion and ring thereby imparting one revolution to said pinion.

3. An odometer sensor as in claim 2, in which said planocentric means is further defined in that the output member is provided with a fixed axis of rotation and said pinion is provided with a traveling axis of rotation, said pinion carrys a plurality of circumferentially arranged openings and said output member carrys a plurality of projections extending respectively through each of said openings, whereby engagement between any of said plurality of projections with the walls of any of said openings is shifted progressively from projection to projection during any one rotation to provide continuous driving contact during an entire revolution of said pinion.

4. An odometer sensor as in claim 2, in which the serrations of said pinion extend radially outwardly and have a maximum diameter measured between the extremities of said serrations, said diameter being less than the minimum diameter of the ring serrations but greater than the maximum diameter of said ring serrations.

5. An odometer sensor as in claim 1, in which said means responsive to each revolution of the output member to provide cyclical energization of said motor comprises a switch mechanism having:
 a. a conductive plate carried by said output member and formed as a sector of a circle greater than 180°, said plate being connected in the circuit to said motor,
 b. a pair of fixed electrical contacts arranged to engage diametrically opposite stations on said output member, whereby as said output member rotates electrical engagement will alternate between said contacts to the sector for any one revolution of said output member thereby providing forming part of a double-acting switch control for said motor.

6. An odometer sensor as in claim 5, in which said switch mechanism has said sector carried flat against one side of said output member, and said contacts extend substantially parallel to the plane of the output member and adjacent thereto.

* * * * *